(12) United States Patent
Plotnikov et al.

(10) Patent No.: US 10,776,093 B2
(45) Date of Patent: Sep. 15, 2020

(54) VECTORIZE STORE INSTRUCTIONS METHOD AND APPARATUS

(71) Applicant: Intel Corporation, Santa Clara, CA (US)

(72) Inventors: Mikhail Plotnikov, Nizhny Novgorod (RU); Hideki Ido, Sunnyvale, CA (US); Xinmin Tian, Fremont, CA (US); Sergey Preis, Novosibirsk (RU); Milind B. Girkar, Sunnyvale, CA (US); Maxim Shutov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/304,644

(22) PCT Filed: Jul. 1, 2016

(86) PCT No.: PCT/RU2016/000410
§ 371 (c)(1),
(2) Date: Nov. 26, 2018

(87) PCT Pub. No.: WO2018/004372
PCT Pub. Date: Jan. 4, 2018

(65) Prior Publication Data
US 2019/0278577 A1    Sep. 12, 2019

(51) Int. Cl.
*G06F 9/44* (2018.01)
*G06F 8/41* (2018.01)

(52) U.S. Cl.
CPC ............. *G06F 8/452* (2013.01); *G06F 8/443* (2013.01)

(58) Field of Classification Search
CPC .................................. G06F 8/443; G06F 8/452
See application file for complete search history.

(56) References Cited

U.S. PATENT DOCUMENTS

| | | |
|---|---|---|
| 5,802,375 A | 9/1998 | Ngo et al. |
| 2011/0161643 A1 | 6/2011 | Eichenberger et al. |
| 2013/0290674 A1* | 10/2013 | George .................. G06F 8/314 |
| | | 712/201 |
| 2014/0096119 A1 | 4/2014 | Vasudevan et al. |
| 2015/0317141 A1 | 11/2015 | Amiri et al. |
| 2016/0299746 A1* | 10/2016 | De ........................... G06F 8/41 |

(Continued)

FOREIGN PATENT DOCUMENTS

WO    WO2014/142972 A1    9/2014

OTHER PUBLICATIONS

ZhongLiang Chen et al., Characterizing Scalar Opportunities in GPGPU Applications, IEEE, 2013, retrieved online on May 15, 2020, pp. 225-234. Retrieved from the Internet: <URL: https://ieeexplore.ieee.org/stamp/stamp.jsp?tp=&arnumber=6557173>. (Year: 2013).*

(Continued)

*Primary Examiner* — Hanh Thi-Minh Bui
(74) *Attorney, Agent, or Firm* — Schwabe, Williamson & Wyatt, P.C.

(57) ABSTRACT

Methods, apparatus, and system to optimize compilation of source code into vectorized compiled code, notwithstanding the presence of output dependencies which might otherwise preclude vectorization.

5 Claims, 7 Drawing Sheets

(56) References Cited

U.S. PATENT DOCUMENTS

2017/0286076 A1* 10/2017 De .................... G06F 9/45504

OTHER PUBLICATIONS

International Search Report and Written Opinion dated Apr. 28, 2017 for International Patent Application No. PCT/RU2016/000410, 18 pages.
Justin Holewinski et al., "Dynamic trace-based analysis of vectorization potential of applications", Jun. 15-20, 2009, 15 pages, Proceedings of the 2009 ACM SIGPLAN Conference on Programming Language Design and Implementation, Dublin, Ireland, a Monthly Publication of the Special Interest Group on Programming Languages of the AS, vol. 47, No. 6, Jun. 11, 2012.

* cited by examiner

VECTORIZE STORE INSTRUCTIONS METHOD AND APPARATUS

CROSS REFERENCE TO RELATED APPLICATIONS

The present application is a national phase entry under 35 U.S.C. § 371 of International Application No. PCT/RU2016/000410, filed Jul. 1, 2016, entitled "VECTORIZE STORE INSTRUCTIONS METHOD AND APPARATUS", which designated, among the various States, the United States of America. The Specifications of the PCT/RU2016/000410 Application is hereby incorporated by reference.

FIELD

The present disclosure relates to the field of computing, in particular to, vectorizing store instructions.

BACKGROUND

In parallel computing, many calculations are carried out simultaneously. Single instruction, multiple data ("SIMD") is a type of parallel computing in which multiple processing elements perform the same operation on multiple data points, generally during the same processor clock cycle or pursuant to one instruction (which, due to page fault, interrupts, and the like, may be spread out over one or more clock cycles).

In SIMD processes, data is handled in blocks; a block or vector comprising a number of values can be loaded into SIMD memory—such as a vector register—with one instruction, rather than requiring a series of instructions. A common function can then be applied to all the values in the block. Thus, processor clock cycles and power can be saved by saving sets of data as one or more vector(s), loading the vector(s) in SIMD memory, and executing a function on the vector(s) and/or vector elements in vector.

SIMD is known to be particularly applicable to processing multimedia data, inasmuch as processing multimedia data often requires applying the same function across large sets of bits or bytes. For example, adjusting contrast in a digital image file may require adding or subtracting a single value from each pixel in an image. This can be performed by loading some or all of the pixels in the image into a single vector register and adding/subtracting the value to all of the pixel values in one instruction.

However, at least write-after-write (write-after-write also being known as output dependence) dependence can prevent a loop or function from operating on vectorized data without potentially causing errors.

For example, in the following pseudo-code in Table 1, indexes for accessing A[ ] array may potentially have the same values pointing to the same memory location. In this case, full vectorization of the loop is not possible, because the order of stores in a vector execution is different from the scalar execution; later execution with respect to an earlier store may overwrite a memory cell, producing an incorrect result.

TABLE 1

```
for(i=0; i<N; i++){
computation_without_dependencies; //no other accesses to A[ ] array
A[index1[i]] = X; //block of stores potentially having dependencies
```

TABLE 1-continued

```
A[index2[i]] = Y;
A[index3[i]] = Z;
}
```

In another example, illustrated in the following pseudo-code in Table 2, values are stored with pointers p1, p2, p3 which may be aliased (equal or intersect randomly), and/or which may be computed in arbitrary (vectorizable) way on each iteration of the loop:

TABLE 2

```
for(i=0; i<N; i++){
computation_without_dependencies; //no other accesses to p1, p2 and p3 pointers
i1 = computation1(i) //any computation depending on iteration or load from memory
i2 = computation2(i) //any computation depending on iteration or load from memory
i3 = computation3(i) //any computation depending on iteration or load from memory
p1[i1] = X; //block of stores potentially having dependencies
p2[i2] = Y;
p3[i2] = Z;
}
```

Legacy approaches to the problem of output dependence and vectorization are to i) serialize the entire loop execution, which foregoes the benefits which may come from vectorization or ii) separately serialize ordered regions of code and, potentially, perform parallel execution of code outside of serialized regions, as e.g., in Section 2.13.8, "ordered Construct" in "OpenMP Application Programming Interface", version 4.5, November, 2015.

Figure 1:
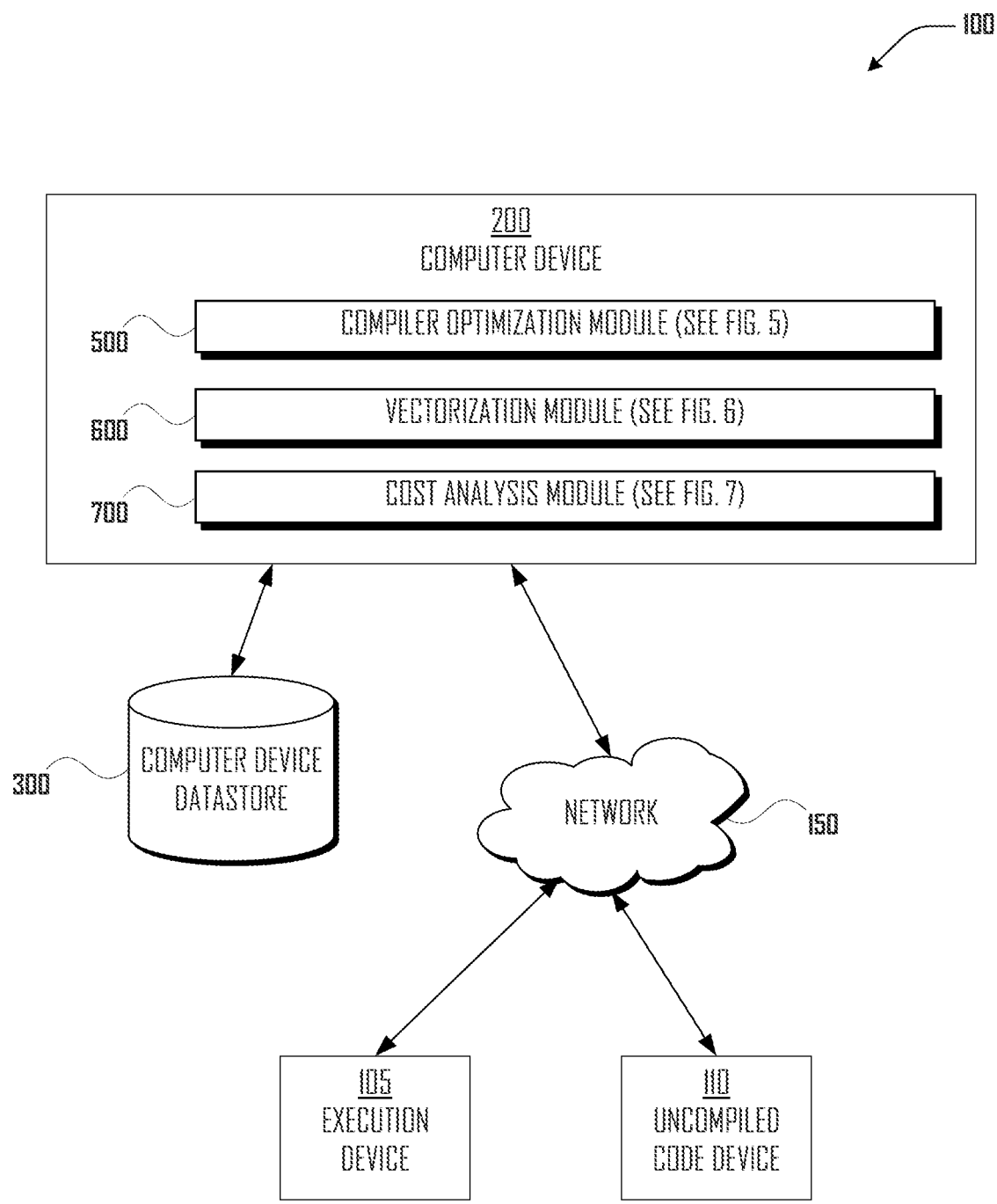
FIG. 1 is a network and device diagram illustrating an example of at least one computer device in a network environment incorporated with teachings of the present disclosure, according to some embodiments.

Although the following Detailed Description will proceed with reference being made to illustrative embodiments, many alternatives, modifications, and variations thereof will be apparent to those skilled in the art.

DETAILED DESCRIPTION

Following are defined terms in this document.

As used herein, a register is a computer memory device capable of storing and providing information. When located in a central processing unit, a register may also be referred to as a processor register.

As used herein, a vector register is a register which holds a one-dimensional array of data, a vector, for vector processing by SIMD and/or other multiple instruction and/or multiple data instruction classifications in Flynn's taxonomy. Vector registers may range e.g., from 64 to 128 bit lengths (which are also referred to as "small-scale" vector registers) to e.g., 256 to 512 or more bits.

As used herein, a vector element, element, or way is a unit into which a vector register may be divided. For example, if a vector register is 256 bits, and if the vector element is 8 bits, then the vector register can process 32 ways or 32 vector elements in the 256 bit vector register.

As used herein, Flynn's taxonomy is a classification of computer architectures by Michael J. Flynn in 1966; Flynn's taxonomy comprises the following classifications: single instruction stream, single data stream ("SISD"), single instruction stream, multiple data streams ("SIMD"), multiple instruction streams, single data stream ("MISD"), multiple instruction streams, multiple data streams ("MIMD"), single program, multiple data streams ("SPMD"), and multiple programs, multiple data streams ("MPMD").

As used herein, SIMD is defined in the background section of this document. SIMD instruction sets can be executed on most central processing units and graphics processing units which exist contemporary with this paper. SIMD instruction sets include International Business Machine's AltiVec and SPE for PowerPC, Hewlett Packard's PA-RISC Multimedia Acceleration eXtensions (MAX), Intel Corporation's MMX and iwMMXt, SSE, SSE2, SSE3 SSSE3 SSE4.x, AVX, Larrabee, and Many Integrated Core Architecture or Xeon Phi architectures, Advanced Micro Device's 3DNow!, ARC International's ARC Video subsystem, SPARC International Inc.'s VIS and VIS2, Sun Microsystem's MAJC, ARM Holding's NEON technology, MIPS Technologies, Inc.'s MDMX (MaDMaX) and MIPS-3D and the like. As discussed herein, Processor 400 described herein may support SIMD instructions 270 which may utilize vector register(s) 421. SIMD instruction set 270 may comprise intrinsics and libraries for invoking vectorized algorithms. SIMD instruction set 270 may require or be able to utilize one or more vector registers of processor 400.

As used herein, the term "module" (or "logic") may refer to, be part of, or include an Application Specific Integrated Circuit (ASIC), a System on a Chip (SoC), an electronic circuit, a processor (shared, dedicated, or group) and/or memory (shared, dedicated, or group) or in another computer hardware component or device that execute one or more software or firmware programs or a combination (having machine instructions supported by the processing units, which may be generated from assemblers or compiled from high level language compilers), a combinational logic circuit, and/or other suitable components that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of an application executing on a processor and a thread corresponds to a portion of a process. A processor may include one or more execution core(s). The processor may be configured to be coupled to a socket.

As used herein, a loop is a sequence of software instruction(s) which is specified once and which is carried out several times in succession. Code inside a loop, or a "loop body" may be executed i) a specified number of times, ii) once for each of a collection of items, iii) until a condition is met, or iv) indefinitely. The number and/or conditions on execution of a loop body may be described in a store execution condition matrix.

As used herein, mutually dependent store instructions, store instructions exhibiting output dependency, or write-after-write store instructions are more than one store instruction which both write to the same memory resource and wherein one of the store instructions must precede the other in order to produce a correct result.

As used herein, logic may refer to an app, software, firmware and/or circuitry configured to perform any of the operations or modules discussed herein. Software may be embodied as a software package, code, instructions, instruction sets and/or data recorded on non-transitory computer readable storage medium. Firmware may be embodied as code, instructions or instruction sets and/or data that are hard-coded (e.g., in a nonvolatile way) in memory devices.

As used herein, circuitry may comprise, for example, singly or in any combination, hardwired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In overview, this disclosure relates to methods and systems in a computing device apparatus to optimize compilation of source code into object or intermediate code (both referred to herein as "compiled code"). As discussed in relation to FIG. 5 and compiler optimization module 500, the disclosed optimization identifies loops or functions with mutually dependent stores (loops or functions which may have output dependency). If the number of mutually dependent stores exceeds a threshold, such that the mutually dependent stores are estimated to result in a significant execution time and/or energy component in the loop or function, then a vectorization procedure may be followed to vectorize the loop/function, with an example of such procedure being discussed in relation to vectorization module 600.

To determine whether execution of the output of the vectorization procedure is more efficient than a scalar execution, a cost analysis may be performed, with an example of a cost analysis being discussed in relation to cost analysis module 700. If the cost analysis indicates that the vectorized loop/function is more efficient and/or is faster, then the disclosed compiler optimization compiles the vectorized version of the loop/function, such as according to the output of the vectorization procedure. If the cost analysis indicates that the vectorized loop/function is less efficient and/or is slower, then the disclosed compiler optimization compiles scalar store instruction(s). The compiled code, such as object or intermediate code, may then be executed, potentially achieving speed benefits of vectorization and parallelized computing (assuming cost analysis indicates that the vectorized loop/function is more efficient and/or is faster), without write-after-write or output dependency errors which might otherwise occur when a loop/function comprising output dependent stores is executed in a vectorized manner.

Figure 6:
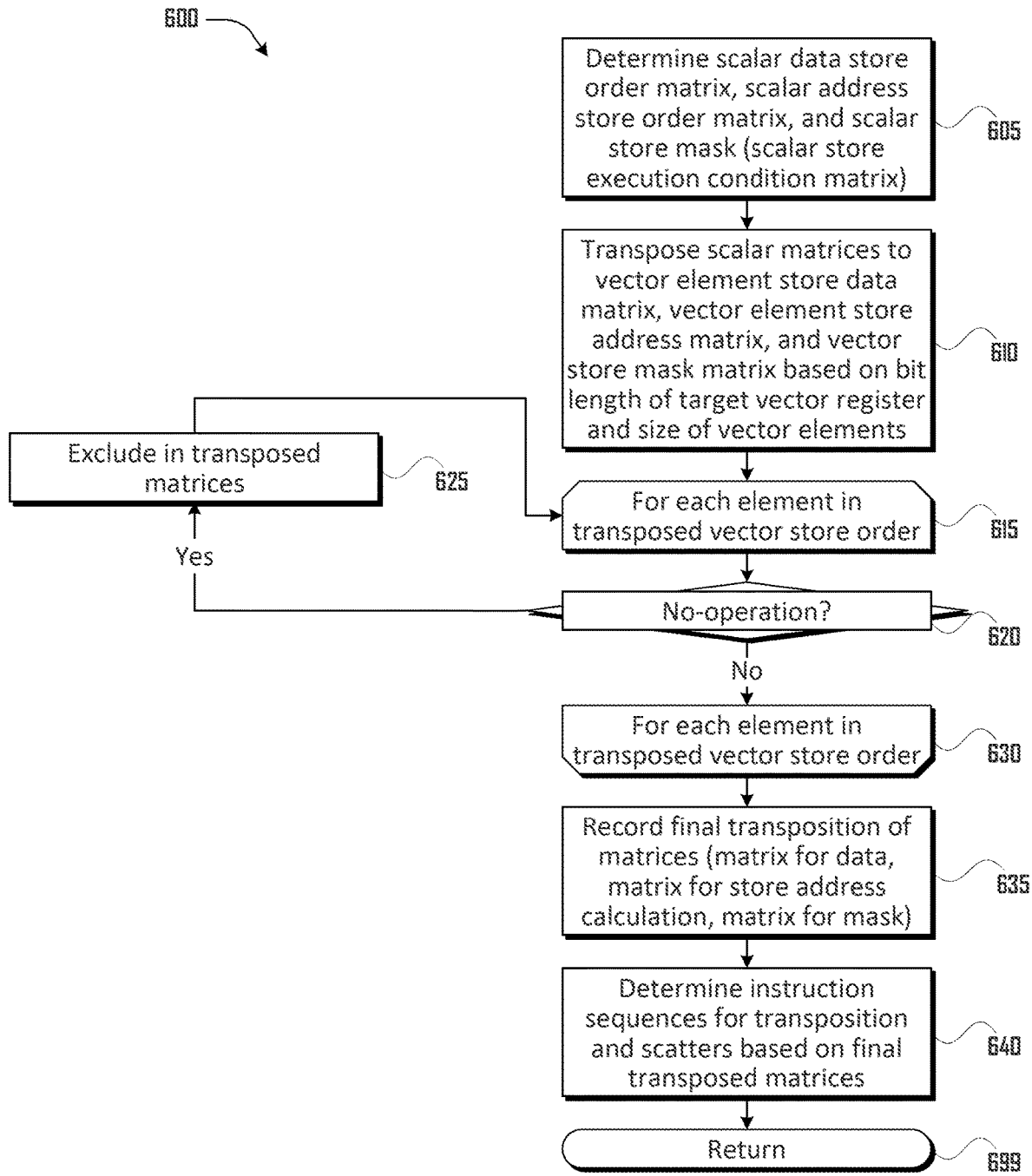
FIG. 6 is a flow diagram illustrating an example of a method performed by a vectorization module, according to some embodiments.

As discussed further in relation to FIG. 6, vectorization module 600 may determine a scalar data store order matrix, a scalar address store order matrix, and a store execution condition matrix which would result from scalar execution of the loop/function. Vectorization module 600 may transpose these matrices into a vector data matrix, a vector address matrix and a vector mask matrix (which dynamically skips stores when conditions are present, such as IF branch outcomes). Vectorization module 600 may exclude no-operation elements in the vector data and vector address matrices. Vectorization module 600 may also determine scatter instruction(s) to scatter the vector matrices.

Figure 7:
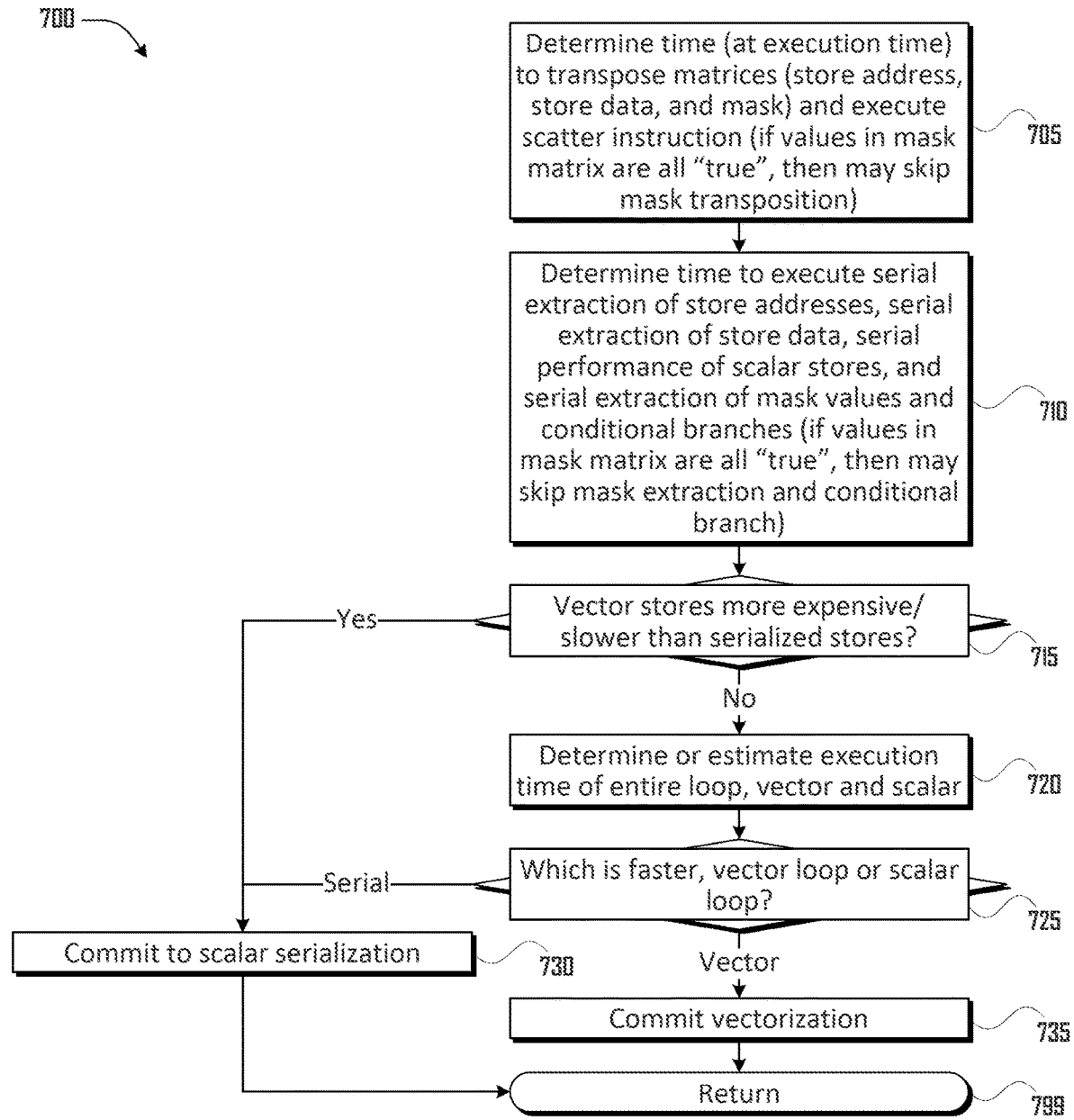
FIG. 7 is a flow diagram illustrating an example of a method performed by a cost analysis module, according to some embodiments.

As discussed further in relation to FIG. 7, cost analysis module 700 determines whether the time required at execution time to transpose the matrices and execute the scatter instruction is longer than the scalar execution time. Cost analysis module 700 may also determine whether the execution time for the entire vectorized loop/function is faster or slower than the execution time for a scalar execution of the loop/function. If the vectorized code and/or vectorized execution time is faster, then cost analysis module 700 may commit to compiling the vectorized loop/function, otherwise, cost analysis module 700 may commit to compiling the serial loop/function.

Pursuant to this disclosure, software developers or programmers may take advantage of SIMD and similar parallel processing instructions with respect to loops/functions which have output dependencies, automatically, without producing output dependency errors and excluding instances in which the vectorized version is not faster than a scalar version.

Referring now to FIG. 1, which is a network and device diagram illustrating in tableau 100 an example of at least one computer device 200, computer device datastore 300, network 150, execution device 105 and uncompile code device 110, incorporated with the teachings of the present disclosure, according to some embodiments. In embodiments, computer device 200 may include a compiler optimization module 500, a vectorization module 600, and a cost analysis module 700, of the present disclosure (to be described more fully below).

Computer device 200 may be used for compiling source code into compiled code, such as object or intermediate code. Computer device 200, except for the teachings of the present disclosure, may include, without limitation, a virtual reality display or supporting computers therefore, a server, a workstation computer, a desktop computer, a laptop computer, a tablet computer (e.g., iPad®, GalaxyTab® and the like), an ultraportable computer, an ultramobile computer, a netbook computer and/or a subnotebook computer; a mobile telephone including, but not limited to a smart phone, (e.g., iPhone®, Android®-based phone, Blackberry®, Symbian®-based phone, Palm®-based phone, etc.) and the like. Computer device 200 may be a server computer or server module within another computer device, such as within execution device 105 or within uncompiled code device 110.

Also illustrated in FIG. 1 is computer device datastore 300. Computer device datastore 300 is described further, herein, though, generally, it should be understood as a datastore used by computer device 200.

Also illustrated in FIG. 1 is network 150. Network 150 may comprise computers, network connections among the computers, and software routines to enable communication between the computers over the network connections. Examples of Network 150 comprise an Ethernet network, the Internet, and/or a wireless network, such as a GSM, TDMA, CDMA, EDGE, HSPA, LTE or other network provided by a wireless service provider. Connection to Network 150 may be via a Wi-Fi connection. More than one network may be involved in a communication session between the illustrated devices. Connection to Network 150 may require that the computers execute software routines which enable, for example, the seven layers of the OSI model of computer networking or equivalent in a wireless phone network.

Also illustrated in FIG. 1 is execution device 105. Execution device 105 may execute compiled code prepared by computer device 200. Execution device 105 may be similar to computer device 200, though execution device 105 may not comprise embodiments of the disclosure herein. Execution device 105 may comprise vector register, similar to vector register 421, and supports a SIMD instruction set, similar to SIMD instruction set 270, such that execution device 105 may be capable of executing compiled vectorized code, such as compiled code 340 obtained directly or indirectly (such as via network 150) from computer device 200.

Also illustrated in FIG. 1 is uncompiled code device 110. Uncompiled code device 110 may be a source or provider (such as via network 150) of uncompiled code to computer device 200. Uncompiled code device 110 may be similar to computer device 200, though uncompiled code device 110 may not comprise embodiments of the disclosure herein. As discussed herein, uncompiled code from uncompiled code device 110 may be stored and/or recorded in computer device 200 as source code 335. Computer device 200 may compile source code 335 into compiled code, such as compiled code 340, pursuant to this disclosure.

Figure 2:
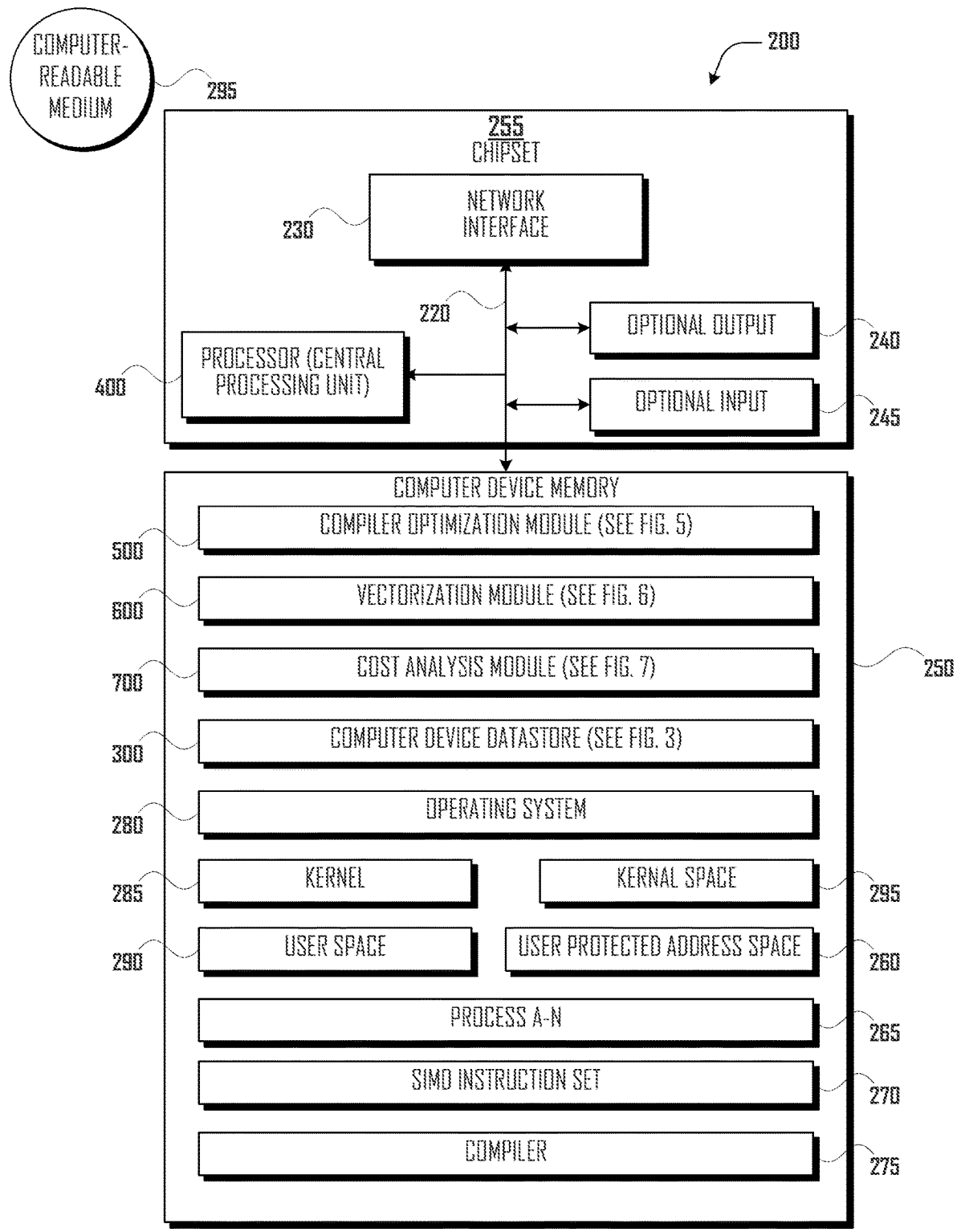
FIG. 2 is a functional block diagram illustrating an example of a computer device incorporated with teachings of the present disclosure, according to some embodiments.

FIG. 2 is a functional block diagram illustrating an example of computer device 200 incorporated with the teachings of the present disclosure, according to some embodiments. Computer device 200 may include chipset 255, comprising processor 400, input/output (I/O) port(s) and peripheral devices, such as output 240 and input 245, and network interface 230, and computer device memory 250, all interconnected via bus 220. Network Interface 230 may be utilized to form connections with Network 150, with computer device datastore 300, or to form device-to-device connections with other computers. Processor 400 may include features that support a SIMD instruction set, such as SIMD instruction set 270, and is discussed and illustrated further in relation to FIG. 4.

Chipset 255 may include communication components and/or paths, e.g., bus(es) 220, that couple processor 400 to peripheral devices, such as, for example, output 240 and input 245, which may be connected via I/O ports. For example, chipset 255 may include a peripheral controller hub (PCH). In another example, chipset 255 may include a sensors hub. Input 245 and output 240 may include, for example, user interface device(s) including a display, a touch-screen display, printer, keypad, keyboard, etc., sensor(s) including accelerometer, global positioning system (GPS), gyroscope, etc., communication logic, wired and/or wireless, storage device(s) including hard disk drives, solid-state drives, removable storage media, etc. I/O ports for input 245 and output 240 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Computer device memory 250 may generally comprise a random access memory ("RAM"), a read only memory ("ROM"), and a permanent mass storage device, such as a disk drive or SDRAM (synchronous dynamic random-access memory). Computer device memory 250 may store program code for software modules or routines, such as, for example, compiler optimization module 500 (illustrated and discussed further in relation to FIG. 5), vectorization module 600 (illustrated and discussed further in relation to FIG. 6), and cost analysis module 700 (illustrated and discussed further in relation to FIG. 7).

Computer device memory 250 may also store operating system 280. These software components may be loaded from a non-transient computer readable storage medium 295 into computer device memory 250 using a drive mechanism associated with a non-transient computer readable storage medium 295, such as a floppy disc, tape, DVD/CD-ROM drive, memory card, or other like storage medium. In some embodiments, software components may also or instead be loaded via a mechanism other than a drive mechanism and computer readable storage medium 295 (e.g., via network interface 230).

Figure 3:
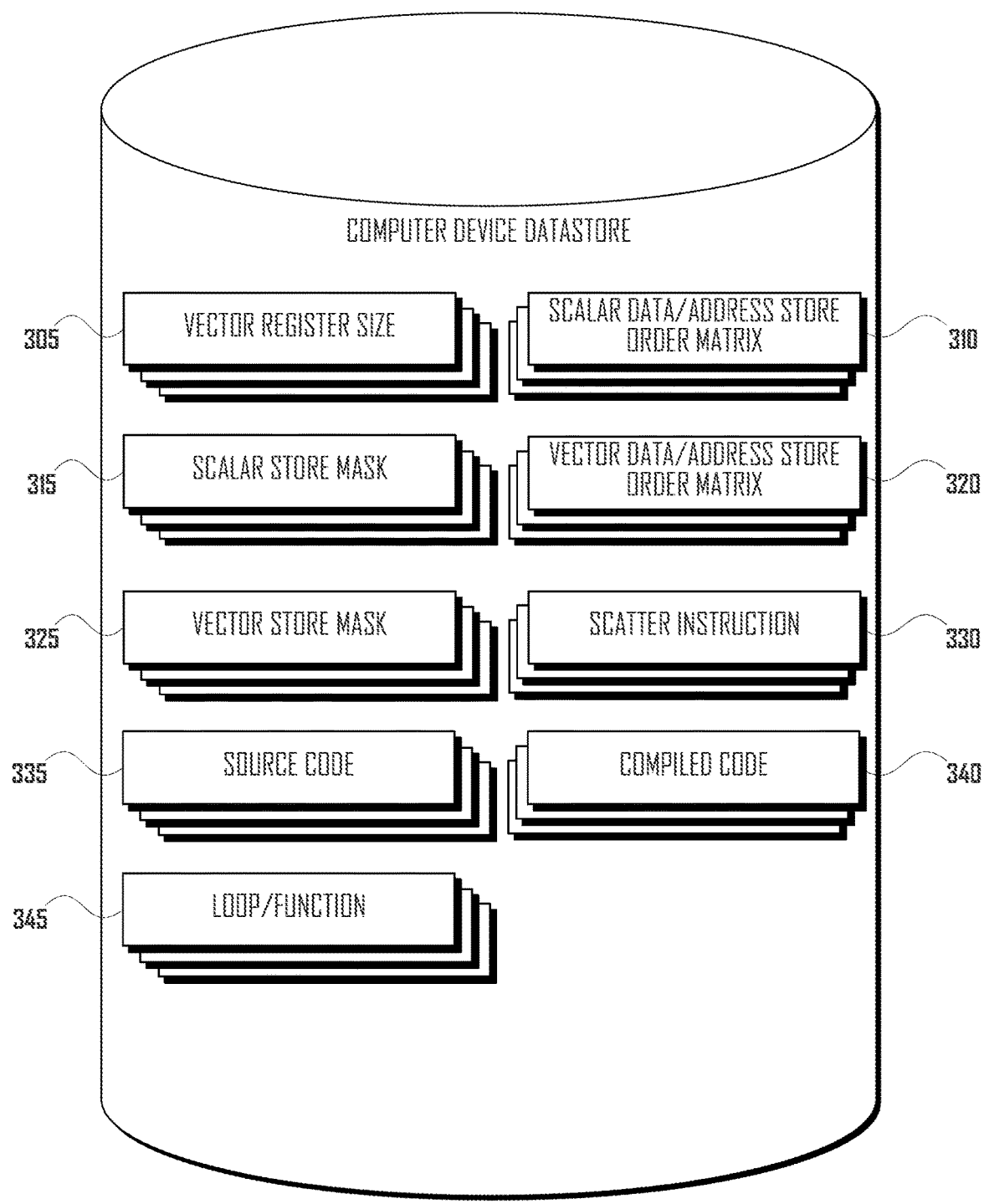
FIG. 3 is a functional block diagram illustrating an example of a computer device datastore for practicing the present disclosure, consistent with embodiments of the present disclosure.

Computer device memory 250 is also illustrated as comprising kernel 285, kernel space 295, user space 290, user protected address space 260, and computer device datastore 300 (illustrated and discussed further in relation to FIG. 3).

Computer device memory 250 may store one or more process 265 (i.e., executing software application(s)). Process 265 may be stored in user space 290. One or more process 265 may execute generally in parallel, i.e., as a plurality of processes and/or a plurality of threads.

Computer device memory 250 is further illustrated as storing operating system 280 and/or kernel 285. The operating system 280 and/or kernel 285 may be stored in kernel space 295. In some embodiments, operating system 280 may include kernel 285.

Kernel 285 may be configured to provide an interface between user processes and circuitry associated with computer device 200. In other words, kernel 285 may be configured to manage access to processor 400, chipset 255, I/O ports and peripheral devices by process 265. Kernel 285 may include one or more drivers configured to manage and/or communicate with components of computer device 200 (i.e., processor 400, chipset 255, I/O ports and peripheral devices).

Computer device memory 250 is further illustrated as storing compiler 275. Compiler 275 may be, for example, a computer program or set of programs that transform source code written in a programming language, such as source code 335, into another computer language. The other computer language may be binary object code, such as an executable program, or intermediate code or bytecode which may be interpreted by a runtime interpreter. Binary object code and intermediate code are referred to herein as compiled code.

Computer device 200 may also comprise or communicate via Bus 220 with computer device datastore 300, illustrated and discussed further in relation to FIG. 3. In various embodiments, bus 220 may comprise a storage area network ("SAN"), a high speed serial bus, and/or via other suitable communication technology. In some embodiments, computer device 200 may communicate with computer device datastore 300 via network interface 230. Computer device 200 may, in some embodiments, include many more components than as illustrated. However, it is not necessary that all components be shown in order to disclose an illustrative embodiment.

FIG. 3 is a functional block diagram of computer device datastore 300 illustrated in the computer device of FIG. 2, according to some embodiments. The components of computer device datastore 300 may include data groups used by modules and/or routines, e.g, vector register size 305, scalar data/address store order matrix 310, scalar store mask 315 (which may also be referred to as scalar store execution condition matrix), vector data/address store order matrix 320, vector store mask 325 (which may also be referred to as vector store execution condition matrix), scatter instruction 330, source code 335, compiled code 340, and loop/function 345 (to be described more fully below). The data groups used by modules or routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

Figure 4:
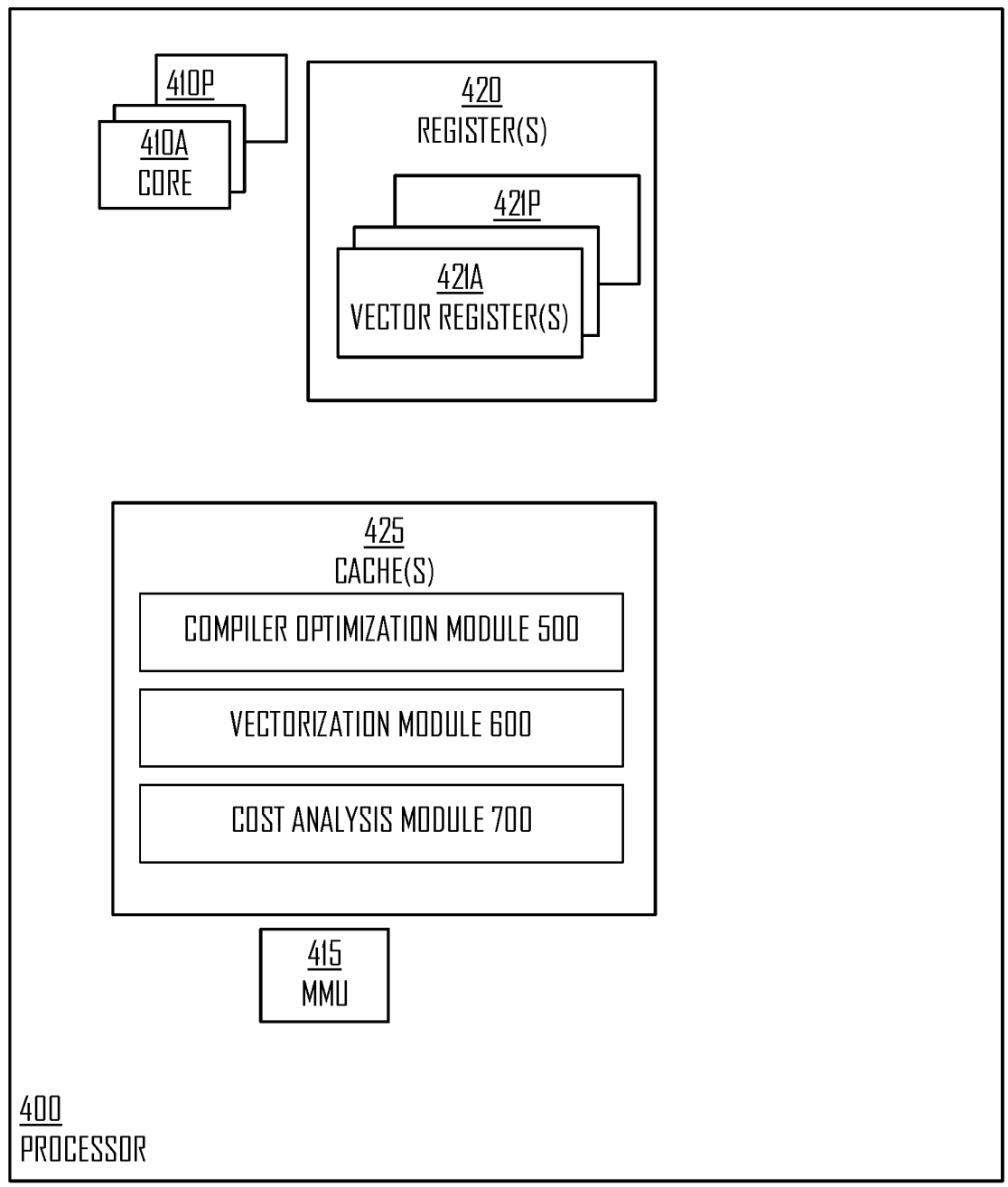
FIG. 4 is a functional block diagram illustrating an example of a processor found in computer device, consistent with embodiments of the present disclosure.

FIG. 4 is a functional block diagram illustrating an example of processor 400, consistent with embodiments of the present disclosure. As illustrated in FIG. 4, processor 400 includes one or more execution core(s) 410A, . . . , 410P, which may be central processing units ("CPUs") and/or graphics processing units ("GPUs") and a plurality of registers 420; registers 420 may include one or more vector registers 421A, . . . , 421P. Processor 400 may further comprise one or more cache memor(ies) 425. Cache(s) 425 may include one or more cache memories, which may be used to cache compiler optimization module 500, vectorization module 600, and cost analysis module 700, of the present disclosure. Processor 400 may include a memory management unit (MMU) 415 to manage memory accesses between processor 400 and computer device memory 250. Each core 410A, . . . , 410P may be configured to execute one or more process(es) and/or one or more thread(s) of the one or more processes. In addition to and/or including vector register 421, the plurality of registers 420 may include a plurality of general purpose registers, a status register and an instruction pointer.

Figure 5:
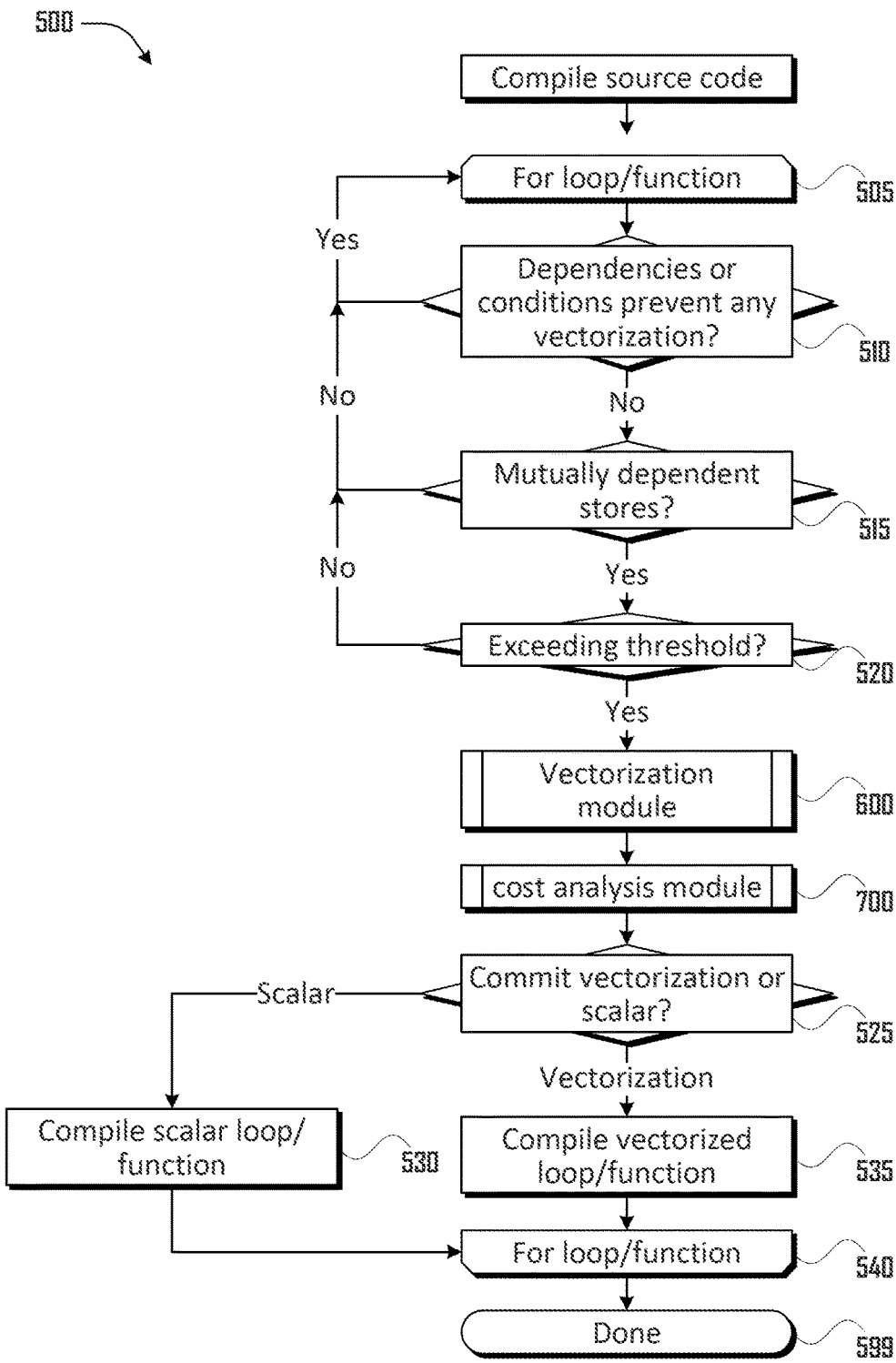
FIG. 5 is a flow diagram illustrating an example of a method performed by a compiler optimization module, according to some embodiments.

FIG. 5 is a flow diagram illustrating an example of compiler optimization module 500, according to some embodiments. Compiler optimization module 500 may be executed by, for example, computer device 200. Compiler optimization module 500 may be executed during compilation of source code into compiled code, such as during execution of compiler 275. Compilation of source code may be with respect to a target computer device, processor, and operating system, such as with respect to execution device 105. Source code being compiled may be stored in computer device datastore 300 as one or more source code 335 records. Compiled code prepared from source code 335 may be store in computer device datastore 300 as one or more compiled code 340 records.

Opening loop block 505 to closing loop block 540 may iterate over one or more loops or functions which occur in source code being compiled. Compiler 275 may compile source code into compiled code using existing compilation techniques, in addition to using the techniques and components disclosed herein, for example, compiler 275 may vectorize other portions of source code using existing vectorization techniques.

As source code is compiled, loops and functions may be identified and/or recorded in computer device datastore 300 as one or more loop/function 345 records.

At decision block 510, a determination may be made regarding whether dependencies or other conditions of the then-current loop or function, loop/function 345, of source code 335, or of intended compiled code (or of an execution device 105), preclude any vectorization. If affirmative or equivalent, then proceeding further with compiler optimization module 500 with respect to the then-current loop/function 345 may be unnecessary and compiler optimization module 500 may return to opening loop block 505 to iterate over the next loop/function 345, if any, which may occur in source code 335 being compiled.

If negative or equivalent at decision block 510, at decision block 515 a determination may be made regarding whether the then-current loop/function 345 comprises any mutually dependent store instructions. If negative or equivalent at decision block 515, then proceeding further with compiler optimization module 500 with respect to the then-current loop/function 345 may be unnecessary and compiler optimization module 500 may return to opening loop block 505 to iterate over the next loop/function 345, if any, which may occur in source code 335 being compiled.

If affirmative or equivalent at decision block 515, then at decision block 520 a determination may be made regarding whether the mutually dependent stores of block 515 exceed a threshold. The threshold may be set by a system administrator, by a user, by a party who programmed compiler optimization module 500 or the like. The threshold may be based on a number of iterations of loop, such as more than one, more than two, etc., iterations.

It should be recognized that one or more of decision blocks 510, 515, and 520 may be omitted and/or may occur in a different order than as illustrated.

If affirmative or equivalent at decision block 520, compiler optimization module 500 may vectorize then-current loop/function 345, taking into account the scalar store order of loop/function 345 and optimizing the scalar store for vector execution. For example, compiler optimization module 500 may execute vectorization module 600, whether independently or as a subroutine or submodule.

Compiler optimization module 500 may determine the relative cost, efficiency, or speed of vectorized and scalar versions of loop/function 345, such as by executing cost analysis module 700, whether independently or as a subroutine or submodule.

At decision block 525, compiler optimization module 500 may determine whether cost analysis of vectorized compiled code or scalar compiled code favors compiling scalar or vectorized code. At block 530, compiler optimization module 500 may compile loop/function 345 in a scalar form or may commit to including scalar compiled form of loop/function 345 in compiled code 340. At block 535, compiler optimization module 500 may compile loop/function 345 in a vector form or may commit to including vector compiled form of loop/function 345 in compiled code 340.

At closing loop block 540, may return to opening loop block 505 to iterate over the next loop or function, if any, as source code 335 is compiled into compiled code 340, such as by compiler 275.

At done block 599, compiler optimization module 500 may conclude and/or may return to a process which may have spawned it.

FIG. 6 is a flow diagram illustrating an example of vectorization module 600, according to some embodiments. Vectorization module 600 may be executed by, for example, computer device 200, whether independently or as a subroutine or submodule of compiler optimization module 500.

At block 605, vectorization module 600 may determine a scalar data store order matrix, a scalar address store order matrix, and a scalar store execution condition matrix in relation to a then-current loop/function 345. Scalar data store order matrix and scalar address store order matrix may be stored in computer device datastore 300 as one or more scalar data/address store order matrix 310 records. Store execution condition matrix may be stored and/or recorded in computer device datastore 300 as one or more scalar store mask 315 records (which may also be referred to as a scalar store execution condition matrix). An example of a scalar data/address store order matrix is shown below, in Table 3.

TABLE 3

|        | Iter3 | Iter2 | Iter1 | Iter0 |
|--------|-------|-------|-------|-------|
| Store1 | X3    | X2    | X1    | X0    |
| Store2 | Y3    | Y2    | Y1    | Y0    |
| Store3 | Z3    | Z2    | Z1    | Z0    |

In Table 3, scalar execution order is X0, Y0, Z0, X1, Y1, Z1, X2, Y2, Z2, X3, Y3, Z3.

Store execution condition matrix is similar, though it may list conditions and/or whether a condition, such as an IF branch, applies to a store.

Legacy vector execution order, in a 4-way vector, would be X0, X1, X2, X3, Y0, Y1, Y2, Y3, Z0, Z1, Z2, Z3. When write-after-write or output dependency is present, such a re-ordering of stores may lead to results which do not match the scalar execution. For example, if Store1 in Iter2 (X2) and Store2 in Iter1 (Y1) are to the same memory location, there is an output dependence between the two. For the sake of simplicity, assume that other stores are to different memory locations. In the scalar execution scenario, the Y1 store is overwritten by the X2 store, setting the value of the memory location after Iter3. In the vector execution scenario, the X2 store is overwritten by the Y1 store. Unless X2 and Y1 stores happened to write the same values by chance, the memory states after all 12 stores (X0 to Z3) are different from each other in scalar execution and vector execution.

At block 610, vectorization module 600 transposes scalar data store order matrix, scalar address store order matrix (from one or more scalar data/address store order matrix 310) and scalar store mask 315 into vector element matrices preserving the scalar order and based on the bit length of a vector register to be used during execution of compiled code 340, such as a bit length of vector register in a target device, such as execution device 105, and a number of vector elements therein. Vector element matrices for scalar data/address store order matrix 310 may be stored in computer device datastore 300 as, for example, one or more vector data/address store order matrix 320 records. Vectorized scalar store mask 315 may be stored as, for example, one or more vector store mask 325 records. An example of transposition of the scalar data/address matrix of Table 3 into a vector element matrix is shown below in Table 4.

TABLE 4

|  | Elem3 | Elem2 | Elem1 | Elem0 |
| --- | --- | --- | --- | --- |
| Store1 | * | Z0 | Y0 | X0 |
| Store2 | * | Z1 | Y1 | X1 |
| Store3 | * | Z2 | Y2 | X2 |
| Store4 | * | Z3 | Y3 | X3 |

The above matrix in Table 4 preserves the scalar store order; vector execution of the above now preserves the scalar execution order, even in the presence of write-after-write or output dependency in the original code (before transposition).

In the above, "*" indicates no-operation vector elements which do not fully utilize the vector register space. These occur because of a mis-match between the number of elements in the vector register (in this case, four), and the number of store instructions (in this case, three) in the scalar version of the loop or function.

A vector store mask 325 record would be similar to the matrix in Table 4, though may contain entries (such as a 0 or 1, one bit per vector element) indicating whether or not a condition applies to the corresponding cell in the vector data/address store order matrix 320 record.

Various techniques could be applied to eliminate no-operation (or irrelevant) vector elements in both vector data/address store order matrix 320 and vector store mask 325. For example, a comparison between the number of store instructions in the scalar loop to the number of ways in the vector register may indicate which elements in the vector data/address store order matrix 320 and vector store mask 325 contain no-operation entries as a bi-product of the mis-match between ways in the vector register and the number of store instructions.

As illustrated in FIG. 6, to exclude no-operation entries, opening loop block 615 to closing loop block 630 iterate over each element in transposed vector data/address store order matrix 320. At decision block 620, vectorization module 600 may determine whether the then-current element is a no-operation element. If affirmative or equivalent at decision block 620, then at block 625 the no-operation element may be excluded from the transposed matrices, vector data/address store order matrices 320 and vector store mask 325. This assumes that the vector data/address store order matrices 320 and vector store mask 325 use the same size vector register with the same number of ways-if they do not, then opening loop block 615 to closing loop block 630 may be executed with respect to both vector data/address store order matrices 320 and vector store mask 325. In the case of some processors, a dedicated mask register may be present in the processor for this purpose.

If negative or equivalent at decision block 620, vectorization module 600 may return to opening loop block 615 to iterate over the next element, if any.

Upon conclusion of iteration of opening loop block 615 to closing loop block 630 across the elements in the transposed matrices, vectorization module 600 may, at block 635, record the final version of vector data/address store order matrices 320 and vector store mask 325. It should be understood that vector data/address store order matrices 320 may be stored as two separate matrices, one for data store order and one for address store order.

In terms of the example illustrated above in Tables 3 and 4, the final version of vector data/address store order matrix 320 would appear as follows in Table 5.

TABLE 5

|  | Elem3 | Elem2 | Elem1 | Elem0 |
| --- | --- | --- | --- | --- |
| Store1 | X1 | Z0 | Y0 | X0 |
| Store2 | Y2 | X2 | Z1 | Y1 |
| Store3 | Z3 | Y3 | X3 | Z2 |

At block 640, vectorization module 600 may determine instruction sequences for transposition, for scatter instruction(s) based on the final transposed matrices. The scatter instruction(s) may accept operands for the vector data store order matrix, for the vector address store order matrix, for the mask, and for a base pointer. Permutation of data, address, and mask, in addition to scatter, may be performed, such as, according to a permutation pattern available at compile time.

The scatter instruction may be executed from lowest to highest vector element and, in the vector of indices (the vector address store order matrix) the indices do not have to be unique and if there is an overlap between indices in neighboring vector elements, then the later one wins. Certain graphics processing units may not obey these rules.

At done block 699, vectorization module 600 may conclude or return to a module or process which may have called it, such as compiler optimization module 500.

FIG. 7 is a flow diagram illustrating an example of a cost analysis module 700, according to some embodiments. Cost analysis module 700 may be executed by, for example computer device 200, whether independently or as a subroutine or submodule of compiler optimization module 500. Cost analysis module 700 may be executed with respect to each loop/function 345 processed by vectorization module 600.

At block 705, cost analysis module 700 may determine or estimate the execution time, such as execution time by execution device 105, which would be required to transpose the matrices (the store address, store data, and mask matrices) and to execute the scatter instruction(s). If the mask values are all true (or equivalent indicators indicating no mask), then time required for transposing the mask matrix may be omitted.

At block 710, cost analysis module 700 may determine or estimate the execution time, such as execution time by execution device 105, which would be required to execute serial extraction of store addresses, serial extraction of store data, serial performance of scalar stores, and serial extraction of mask values and conditional branches (per scalar store mask 315). As with block 705, if values in the scalar store mask are all true (or equivalent), then the mask may be skipped.

At decision block 715, cost analysis module 700 may determine which is faster, the vectorized store execution or the scalar execution. If affirmative or equivalent at decision block 715 (indicating that scalar execution of the loop/function is faster), then at block 730, cost analysis module 700 may commit to scalar serialization of the loop/function.

If negative or the equivalent at decision block 715 (indicating that vector execution is faster), then at block 720, cost analysis module 700 may determine or estimate the execution time of the entire loop/function in both vector and scalar forms.

At decision block 725, cost analysis module 700 may, based on the result of block 720, determine which is faster, the vectorized loop/function or the scalar loop/function. If vector at decision block 725, then at block 735, cost analysis module 700 may commit to vectorization of the loop/function. If scalar at decision block 725, then at block 730, cost analysis module 700 may commit to scalar serialization of the loop/function.

At done block 799, cost analysis module 700 may conclude and/or return to another process or module which may have spawned it, such as compiler optimization module 500.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

Following are examples:

Example 1

An apparatus for computing, comprising: a computer processor and a memory; and a vectorization module to vectorize a set of mutually dependent store instructions in a loop or function in a source code, wherein to vectorize the set of mutually dependent store instructions, the vectorization module is to determine a scalar store order for the set of mutually dependent store instructions and determine a vectorized store order for the scalar store order.

Example 2

The apparatus according to Example 1, wherein determine the vectorized store order for the scalar store order comprises determine the vectorized store order for the scalar store order based on a number of vector elements in a vector register coupled to a target computer processor.

Example 3

The apparatus according to Example 2, wherein determine the vectorized store order for the scalar store order based on the number of vector elements in the vector register coupled to the target computer processor further comprises exclude a no-operation store instruction from the vectorized store order.

Example 4

The apparatus according to Example 3, wherein exclude the no-operation store instruction from the vectorized store order comprises exclude the no-operation store instruction from the vectorized store order when such no-operation store instruction occurs because of a difference in size between a scalar matrix comprising the number of sequential scalar instruction iterations and the number of sequential store instructions in each iteration in the number of sequential scalar instruction iterations and a vector matrix comprising the number of vector elements executed by a SIMD instruction using the vector register.

Example 5

The apparatus according to Example 2, wherein determine the vectorized store order for the scalar store order comprises determine the vectorized store order according to a number of sequential scalar instruction iterations and a number of sequential store instructions in each iteration in the number of sequential scalar instruction iterations.

Example 6

The apparatus according to Example 5, wherein a scalar matrix comprising the number of sequential scalar instruction iterations and the number of sequential store instructions in each iteration in the number of sequential scalar instruction iterations is less than a vector matrix comprising the number of elements executed by a SIMD instruction using the vector register.

Example 7

The apparatus according to Example 1, wherein determine the vectorized store order for the scalar store order further comprises transpose each store instruction in the set of mutually dependent store instructions into an element in a set of elements executed by a single instruction, multiple data (SIMD) instruction using a vector register coupled to a target computer processor.

Example 8

The apparatus according to Example 7, wherein transpose each store instruction in the set of mutually dependent store instructions into the element in the set of elements further comprises fill each element in the set of elements with each store instruction in the set of mutually dependent store instructions.

Example 9

The apparatus according to Example 8, wherein fill each element in the set of elements executed by the SIMD instruction with each store instruction in the set of mutually dependent store instructions further comprises exclude a no-operation store instruction.

Example 10

The apparatus according to Example 1, wherein the vectorization module is further to determine a scatter instruction to store a result of the vectorized store order to a set of non-contiguous or random locations in a target memory.

Example 11

The apparatus according to Example 1, further comprising a compilation optimization module to optimize compilation of the source code, wherein to optimize compilation of the source code, the compilation optimization module is to determine that the loop or function comprises mutually dependent store instructions.

Example 12

The apparatus according to Example 11, wherein the compilation optimization module is further to compile the source code comprising the loop or function into a compiled code for a target computer.

Example 13

The apparatus according to Example 11, further comprising a cost analysis module to compare execution of a scalar version of the loop or function and a vector version of the loop or function, wherein to compare execution of a scalar version of the loop or function and a vector version of the loop or function the cost analysis module is to compare i) an execution time of a vector transposition of the mutually dependent store instructions plus an execution time for a scatter instruction associated with the vector transposition of the mutually dependent store instructions to ii) a serialized scalar execution of the set of mutually dependent store instructions.

Example 14

The apparatus according to Example 12, wherein the target computer supports vector processing.

Example 15

The apparatus according to Example 14, wherein the target computer comprises at least one vector register.

Example 16

The apparatus according to Example 14, wherein target computer supports single instruction, multiple data (SIMD) instructions.

Example 17

The apparatus according to Example 1, wherein the set of mutually dependent store instructions comprises write-after-write store instructions.

Example 18

A computer implemented method, comprising: determining a scalar store order for a set of mutually dependent store instructions in a loop or function in a source code; and determining a vectorized store order for the scalar store order.

Example 19

The method according to Example 18, wherein determining the vectorized store order for the scalar store order comprises determining the vectorized store order for the scalar store order based on a number of vector elements in a vector register coupled to a target computer processor.

Example 20

The method according to Example 19, wherein determining the vectorized store order for the scalar store order based on the number of vector elements in the vector register coupled to the target computer processor further comprises excluding a no-operation store instruction from the vectorized store order.

Example 21

The method according to Example 20, wherein excluding the no-operation store instruction from the vectorized store order comprises excluding the no-operation store instruction from the vectorized store order when such no-operation store instruction occurs because of a difference in size between a scalar matrix comprising the number of sequential scalar instruction iterations and the number of sequential store instructions in each iteration in the number of sequential scalar instruction iterations and a vector matrix comprising the number of vector elements executed by a SIMD instruction using the vector register.

Example 22

The method according to Example 19, wherein determining the vectorized store order for the scalar store order comprises determining the vectorized store order according to a number of sequential scalar instruction iterations and a number of sequential store instructions in each iteration in the number of sequential scalar instruction iterations.

Example 23

The method according to Example 21, wherein a scalar matrix comprising the number of sequential scalar instruction iterations and the number of sequential store instructions in each iteration in the number of sequential scalar instruction iterations is less than a vector matrix comprising the number of elements executed by a SIMD instruction using the vector register.

Example 24

The method according to Example 18, wherein determining the vectorized store order for the scalar store order further comprises transposing each store instruction in the set of mutually dependent store instructions into an element in a set of elements executed by a single instruction, multiple data (SIMD) instruction using a vector register coupled to a target computer processor.

Example 25

The method according to Example 24, wherein transposing each store instruction in the set of mutually dependent store instructions into the element in the set of elements further comprises filling each element in the set of elements with each store instruction in the set of mutually dependent store instructions.

Example 26

The method according to Example 25, wherein filling each element in the set of elements executed by the SIMD instruction with each store instruction in the set of mutually dependent store instructions further comprises excluding a no-operation store instruction.

Example 27

The method according to Example 18, further comprising determining a scatter instruction to store a result of the vectorized store order to a set of non-contiguous or random locations in a target memory.

Example 28

The method according to Example 18, further comprising determining that the loop or function comprises mutually dependent store instructions.

Example 29

The method according to Example 28, further comprising compiling the source code comprising the loop or function into a compiled code for a target computer.

Example 30

The method according to Example 28, further comprising comparing i) an execution time of a vector transposition of the mutually dependent store instructions plus an execution time for a scatter instruction associated with the vector transposition of the mutually dependent store instructions to ii) a serialized scalar execution of the set of mutually dependent store instructions.

Example 31

The method according to Example 29, wherein the target computer supports vector processing.

Example 32

The method according to Example 31, wherein the target computer comprises at least one vector register.

Example 33

The method according to Example 31, wherein target computer supports single instruction, multiple data (SIMD) instructions.

Example 34

The method according to Example 18, wherein the set of mutually dependent store instructions comprises write-after-write store instructions.

Example 35

An apparatus for computing, comprising: means to determine a scalar store order for a set of mutually dependent store instructions in a loop or function in a source code; and means to determine a vectorized store order for the scalar store order.

Example 36

The apparatus according to Example 35, wherein means to determine the scalar store order for the set of mutually dependent store instructions comprises means to determine the vectorized store order for the scalar store order based on a number of vector elements in a vector register coupled to a target computer processor.

Example 37

The apparatus according to Example 36, wherein means to determine the vectorized store order for the scalar store order based on the number of vector elements in the vector register coupled to the target computer processor further comprises means to exclude a no-operation store instruction from the vectorized store order.

Example 38

The apparatus according to Example 37, wherein means to exclude the no-operation store instruction from the vectorized store order comprises means to exclude the no-operation store instruction from the vectorized store order when such no-operation store instruction occurs because of a difference in size between a scalar matrix comprising the number of sequential scalar instruction iterations and the number of sequential store instructions in each iteration in the number of sequential scalar instruction iterations and a vector matrix comprising the number of vector elements executed by a SIMD instruction using the vector register.

Example 39

The apparatus according to Example 36, wherein means to determine the vectorized store order for the scalar store order comprises means to determine the vectorized store order according to a number of sequential scalar instruction iterations and a number of sequential store instructions in each iteration in the number of sequential scalar instruction iterations.

Example 40

The apparatus according to Example 38, wherein a scalar matrix comprising the number of sequential scalar instruction iterations and the number of sequential store instructions in each iteration in the number of sequential scalar instruction iterations is less than a vector matrix comprising the number of elements executed by a SIMD instruction using the vector register.

Example 41

The apparatus according to Example 35, wherein means to determine the vectorized store order for the scalar store order further comprises means to transpose each store instruction in the set of mutually dependent store instructions into an element in a set of elements executed by a single instruction, multiple data (SIMD) instruction using a vector register coupled to a target computer processor.

Example 42

The apparatus according to Example 41, wherein means to transpose each store instruction in the set of mutually dependent store instructions into the element in the set of elements further comprises means to fill each element in the set of elements with each store instruction in the set of mutually dependent store instructions.

Example 43

The apparatus according to Example 42, wherein means to fill each element in the set of elements executed by the SIMD instruction with each store instruction in the set of mutually dependent store instructions further comprises means to exclude a no-operation store instruction.

Example 44

The apparatus according to Example 35, further comprising means to determine a scatter instruction to store a result of the vectorized store order to a set of non-contiguous or random locations in a target memory.

Example 45

The apparatus according to Example 35, further comprising means to determine that the loop or function comprises mutually dependent store instructions.

Example 46

The apparatus according to Example 45, further comprising means to compile the source code comprising the loop or function into a compiled code for a target computer.

Example 47

The apparatus according to Example 45, further comprising means to compare i) an execution time of a vector transposition of the mutually dependent store instructions plus an execution time for a scatter instruction associated with the vector transposition of the mutually dependent store instructions to ii) a serialized scalar execution of the set of mutually dependent store instructions.

Example 48

The apparatus to Example 46, wherein the target computer supports vector processing.

Example 49

The apparatus according to Example 48, wherein the target computer comprises at least one vector register.

Example 50

The method according to Example 48, wherein target computer supports single instruction, multiple data (SIMD) instructions.

Example 51

The apparatus according to Example 35, wherein the set of mutually dependent store instructions comprises write-after-write store instructions.

Example 52

One or more computer-readable media comprising instructions that cause a computer device, in response to execution of the instructions by a processor of the computer device, to: by the computer device, determine a scalar store order for a set of mutually dependent store instructions in a loop or function in a source code; and by the computer device, determine a vectorized store order for the scalar store order.

Example 53

The computer-readable media according to Example 52, wherein determine the vectorized store order for the scalar store order comprises determine the vectorized store order for the scalar store order based on a number of vector elements in a vector register coupled to a target computer processor.

Example 54

The computer-readable media according to Example 53, wherein determine the vectorized store order for the scalar store order based on the number of vector elements in the vector register coupled to the target computer processor further comprises exclude a no-operation store instruction from the vectorized store order.

Example 55

The computer-readable media according to Example 54, wherein exclude the no-operation store instruction from the vectorized store order comprises exclude the no-operation store instruction from the vectorized store order when such no-operation store instruction occurs because of a difference in size between a scalar matrix comprising the number of sequential scalar instruction iterations and the number of sequential store instructions in each iteration in the number of sequential scalar instruction iterations and a vector matrix comprising the number of vector elements executed by a SIMD instruction using the vector register.

Example 56

The computer-readable media according to Example 53, wherein determine the vectorized store order for the scalar store order comprises determine the vectorized store order according to a number of sequential scalar instruction iterations and a number of sequential store instructions in each iteration in the number of sequential scalar instruction iterations.

Example 57

The computer-readable media according to Example 55, wherein a scalar matrix comprising the number of sequential scalar instruction iterations and the number of sequential store instructions in each iteration in the number of sequential scalar instruction iterations is less than a vector matrix comprising the number of elements executed by a SIMD instruction using the vector register.

Example 58

The computer-readable media according to Example 52, wherein determine the vectorized store order for the scalar store order further comprises transpose each store instruction in the set of mutually dependent store instructions into an element in a set of elements executed by a single instruction, multiple data (SIMD) instruction using a vector register coupled to a target computer processor.

Example 59

The computer-readable media according to Example 58, wherein transpose each store instruction in the set of mutually dependent store instructions into the element in the set of elements further comprises fill each element in the set of elements with each store instruction in the set of mutually dependent store instructions.

Example 60

The computer-readable media according to Example 59, wherein fill each element in the set of elements executed by the SIMD instruction with each store instruction in the set of mutually dependent store instructions further comprises exclude a no-operation store instruction.

Example 61

The computer-readable media according to Example 52, further comprising determine a scatter instruction to store a result of the vectorized store order to a set of non-contiguous or random locations in a target memory.

Example 62

The computer-readable media according to Example 52, further comprising determine that the loop or function comprises mutually dependent store instructions.

Example 63

The computer-readable media according to Example 62, further comprising to compile the source code comprising the loop or function into a compiled code for a target computer.

Example 64

The computer-readable media according to Example 62, further comprising compare i) an execution time of a vector transposition of the mutually dependent store instructions plus an execution time for a scatter instruction associated with the vector transposition of the mutually dependent store instructions to ii) a serialized scalar execution of the set of mutually dependent store instructions.

Example 65

The computer-readable media according to Example 63, wherein the target computer supports vector processing.

Example 66

The computer-readable media according to Example 65, wherein the target computer comprises at least one vector register.

Example 67

The computer-readable media according to Example 65, wherein target computer supports single instruction, multiple data (SIMD) instructions.

Example 68

The computer-readable media according to Example 52, wherein the set of mutually dependent store instructions comprises write-after-write store instructions.

What is claimed is:

1. An apparatus for computing, comprising:
   a computer processor and a memory;
   a compilation optimization module disposed in the memory, and operated by the computer processor, to optimize compilation of a set of source code into a set of executable code for a target execution environment, wherein to optimize compilation of the source code, the compilation optimization module is to determine that a loop or function in the source code comprises a set of mutually dependent store instructions;
   a vectorization module disposed in the memory, and operated by the computer processor, to vectorize the set of mutually dependent store instructions in the loop, wherein to vectorize the set of mutually dependent store instructions, the vectorization module is to determine a scalar store order matrix for the set of mutually dependent store instructions, transpose the scalar store order matrix into an initial vector element matrix preserving the scalar store order and based at least in part on a bit length of a vector register in the target execution environment, eliminate no-operation vector elements in the initial vector element matrix to generate a final vector element matrix, and determine at least one scatter instruction to store vector elements in the final vector element matrix to a set of non-contiguous or random locations in a target memory of the target execution environment; and
   a cost analysis module disposed in the memory, and operated by the computer processor, to compare execution of a scalar version of the loop or function and a vector version of the loop or function, wherein to compare execution of a scalar version of the loop or function and a vector version of the loop or function the cost analysis module is to compare i) an execution time of the transposition of the scalar store order matrix into the initial vector element matrix plus an execution time for the at least one scatter instruction to ii) a serialized scalar execution of the set of mutually dependent store instructions.

2. The apparatus according to claim 1, wherein the target execution environment supports vector processing, comprises at least the vector register, and supports single instruction, multiple data (SIMD) instructions.

3. A computer implemented method, comprising:
   determining that a loop or function in a set of source code comprises mutually dependent store instructions, the set of source code being compiled into a set of executable code for a target execution environment;
   determining a scalar store order for a set of mutually dependent store instructions in the loop or function;
   determining a vectorized store order for the scalar store order and at least one scatter instruction to store a result of the vectorized store order to a set of non-contiguous or random locations in a target memory of the target execution environment;
   wherein determining a vectorized store order for the scalar store order comprises determining a scalar store order matrix for the set of mutually dependent store instructions, transposing the scalar store order matrix into an initial vector element matrix preserving the scalar store order and based at least in part on a bit length of a vector register in the target execution environment, and eliminating no-operation vector elements in the initial vector element matrix to generate a final vector element matrix;
   wherein determining at least one scatter instruction to store the result of the vectorized store order comprises determining at least one scatter instruction to store vector elements of the final vector element matrix to the set of non-contiguous or random locations in the target memory of the target execution environment; and
   comparing i) an execution time of the transposing of the scalar store order matrix into the initial vector element matrix plus an execution time for the at least one scatter instruction to ii) a serialized scalar execution of the set of mutually dependent store instructions.

4. The method according to claim 3, wherein the target computing environment supports vector processing, comprises at least the vector register, and supports single instruction, multiple data (SIMD) instructions.

5. One or more non-transitory computer-readable media comprising instructions that cause a computer device, in response to execution of the instructions by a processor of the computer device, to:
- by the computer device, determine that a loop or function in a set of source code comprises mutually dependent store instructions, the set of source code being compiled into a set of executable code for a target execution environment;
- by the computer device, determine a scalar store order for a set of mutually dependent store instructions in a loop or function;
- by the computer device, determine a vectorized store order for the scalar store order and at least one scatter instruction to store a result of the vectorized store order to a set of non-contiguous or random locations in a target memory, wherein determine a vectorized store order for the scalar store order comprises determine a scalar store order matrix for the set of mutually dependent store instructions, transpose the scalar store order matrix into an initial vector element matrix preserving the scalar store order and based at least in part on a bit length of a vector register in the target execution environment, and eliminate no-operation vector elements in the initial vector element matrix to generate a final vector element matrix; wherein determine at least one scatter instruction to store the result of the vectorized store order comprises determine at least one scatter instruction to store vector elements of the final vector element matrix to the set of non-contiguous or random locations in the target memory of the target execution environment; and
- compare i) an execution time of the transposition of the scalar store order matrix into the initial vector element matrix plus an execution time for the at least one scatter instruction to ii) a serialized scalar execution of the set of mutually dependent store instructions.

* * * * *